United States Patent [19]

Hattori

[11] 4,245,975

[45] Jan. 20, 1981

[54] MEDIUM RETAINING DEVICE IN SINGLE FACED CORRUGATED CARDBOARD MANUFACTURING MACHINE

[75] Inventor: Fukutaro Hattori, Kasugai, Japan

[73] Assignee: Isowa Industry Co., Ltd., Japan

[21] Appl. No.: 102,845

[22] Filed: Dec. 12, 1979

[30] Foreign Application Priority Data

Dec. 22, 1978 [JP] Japan ............................... 53-158932

[51] Int. Cl.³ ........................... B30B 3/00; B29D 7/14

[52] U.S. Cl. ..................................... 425/363; 425/369

[58] Field of Search ........... 425/363, 367, 369, 405 R, 425/396

[56] References Cited

U.S. PATENT DOCUMENTS

| | | | |
|---|---|---|---|
| 3,954,368 | 5/1976 | Kawakomi | 425/363 X |
| 3,960,475 | 6/1976 | De Ligt et al. | 425/363 X |
| 4,116,594 | 9/1978 | Leanna et al. | 425/363 X |
| 4,202,719 | 5/1980 | Linn | 425/369 X |

*Primary Examiner*—J. Howard Flint, Jr.
*Attorney, Agent, or Firm*—Fleit & Jacobson

[57] ABSTRACT

A plurality of longitudinally spaced annular suction grooves are formed in one of a pair of corrugating rolls on the peripheral surface thereof and a plurality of suction manifolds are formed in the corrugating roll and extend longitudinally of the roll in intersecting relationship with the annular suction grooves.

2 Claims, 2 Drawing Figures

Figure 1:
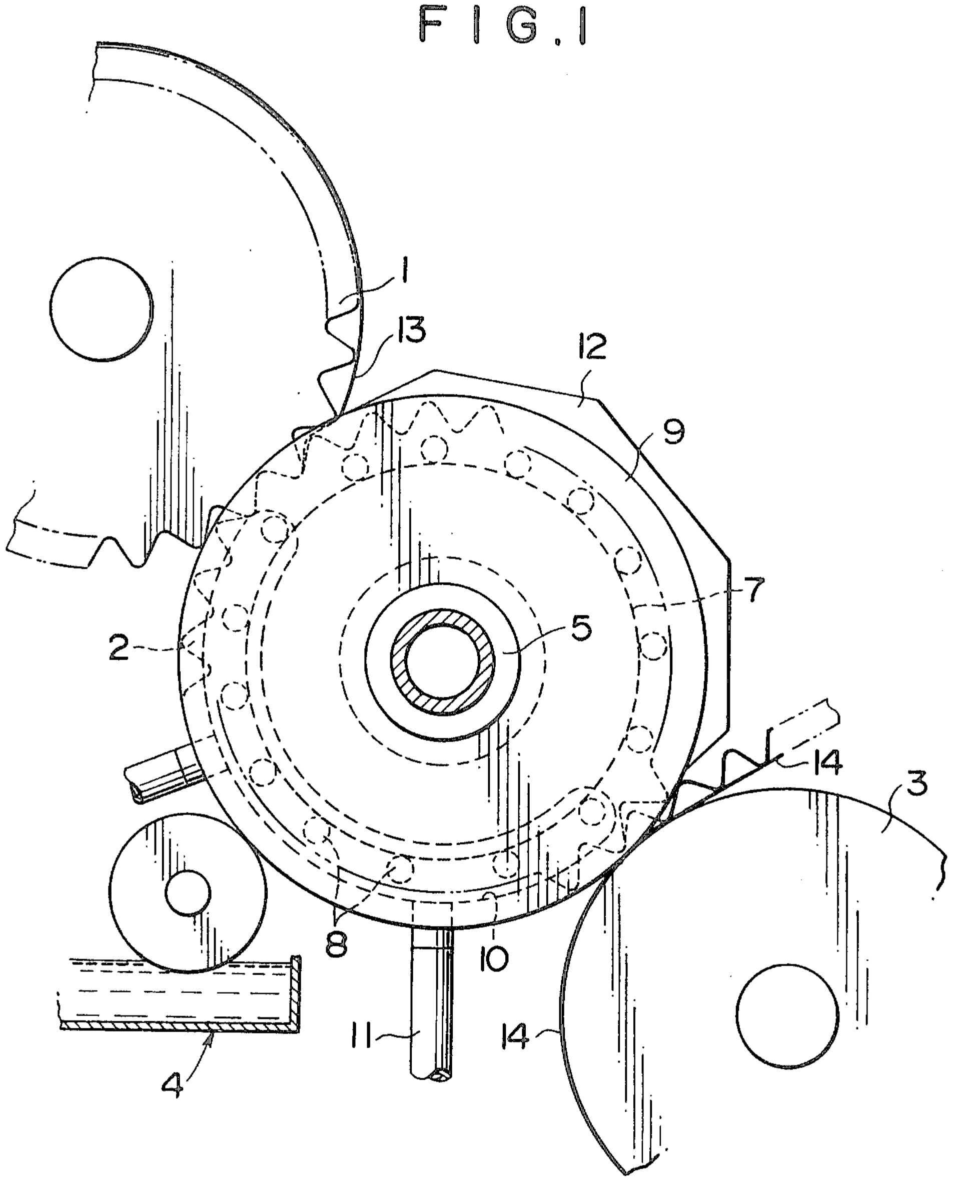

MEDIUM RETAINING DEVICE IN SINGLE FACED CORRUGATED CARDBOARD MANUFACTURING MACHINE

This invention relates to a single faced corrugated paperboard manufacturing apparatus and more particularly to a medium retaining device comprising a pair of corrugating rolls between which a medium is passed to form corrugations therein, the corrugated medium being retained on the lower corrugating roll.

In general, the single faced corrugated paperboard manufacturing apparatus comprises a pair of upper and lower rolls engaging with each other between which a medium is passed to form corrugations therein; an adhesive applicator which applies adhesive to the tops of the corrugations formed in the medium while the corrugated medium is carried on the lower corrguating roll; a pressure roll which presses a facing paper web against the adhesive-applied corrugated medium on the lower corrugating roll to bond them together; and finger plates which retain the corrugated medium on the lower corrugating roll against centrifugal force while the corrugated medium is carried on the lower roll, the centrifugal force acting to cause the corrugated medium to move away from the lower roll. With this arrangement, since the corrugated medium is constantly in contact with the finger plates, the finger plates easily wear, making it necessary to adjust the finger plate position relative to the lower corrugating roll. Poor adjustment of the finger plate positin would result in adhesive being unevenly applied to the tops of the corrugations and corrugations being crushed or deformed, deteriorating the quality of the corrugated paperboard products. Further, this construction of the single faced corrugated paperboard manufacturing machine has another disadvantage in that since a plurality of finger plates are arranged longitudinally of the corrugating roll at narrow intervals of about 100 mm, the tops of the corrugations facing the finger plates are not applied with adhesive so that the corrugated medium has the corresponding number of strips that are devoid of adhesive extending along the length of the medium.

For the purpose of eliminating the abovementioned disadvantage there have been proposed various kinds of devices in which the corrugated medium is attracted to and retained on the lower corrugating roll by the action of suction provided by negative pressure. In one of these devices, a plurality of annular suction grooves are formed on the peripheral surface of the lower corrugating roll in longitudinally spaced relation and a pair of suction nozzles are inserted into each of these suction grooves at that portion of the roll surface where the corrugated medium is not carried. In this device, when the suction is applied to the suction grooves through the suction nozzles, the corrugated medium is sucked onto the lower corrugating roll by the action of suction produced by a negative pressure. Although this device may be worthy of some acclaim in theory, it is seriously defective in that the suction nozzles become clogged with paper dust from the medium, thus inviting a decrease in suction ability. The device therefore cannot be put into full practical use. An example of another construction is one in which a multiplicity of radially extending suction holes are formed in the lower roll to communicate the hollow portion of the roll with the annular suction grooves so that the negative pressure can be applied to the annular suction grooves through these suction holes. With this construction, however, it is necessary to drill an extremely large number of suction holes in the roll at positions corresponding to respective annular suction grooves, a requirement that poses major difficulties in terms of machining. This construction also has a serious problem in that, as in the case with the previously mentioned nozzle type, the suction holes are easily clogged with paper dust from the medium. To restore the suction capacity, it is necessary to clean the numerous suction holes, giving rise to a serviceability problem. Heating the medium by the corrugating roll is indispensable for forming corrugations in the medium and for bonding the facing paper web to the corrugated medium with starch adhesive. For this reason, the hollow portion in the corrugating roll has been used as a steam chamber. In the above construction in which the hollow portion is used as a suction chamber, however, it is no longer possible to heat the corrugating roll and therefore separate heating means must be provided.

The object of this invention is to provide a medium retaining device in a single faced corrugated paperboard manufacturing machine which overcomes the above-mentioned disadvantages.

In the medium retaining device of this invention, a plurality of longitudinally extending suction manifolds are formed in the lower corrugating roll in such a manner as to intersect a number of longitudinally spaced annular suction grooves formed on the peripheral surface of the lower roll. The lower corrugating roll is provided at both ends with sealing members which are held stationary so as not to rotate with the roll. Each of the sealing members has a semicircular recess formed therein and extending from the nip between the upper and lower corrugating rolls to the nip between the lower roll and the pressure roll along that portion of the surface of the lower roll on which the corrugated medium is carried. The suction manifolds in the lower corrugating roll communicate at both ends with the semicircular recesses formed in the sealing members. The semicircular recesses are connected to the vacuum source through the suction pipes. To prevent the loss of negative pressure developed in the annular suction grooves, a cover is placed on the portion of the lower roll surface on which no medium is carried. Thus, in this invention, immediately after the medium is passed between the upper and lower rolls to form the corrugations in the medium, the corrugated medium is attracted to the peripheral surface of the lower corrugating roll by applying negative pressure to the corrugated medium through the annular suction grooves and the suction manifolds. During the rotation of the roll, about one-half of the suction manifolds communicate with the recesses which form suction chambers, so that the negtive pressure in the annular suction grooves is kept constant.

An embodiment of this invention will now be described in detail referring to the accompanying drawings.

Figure 2:
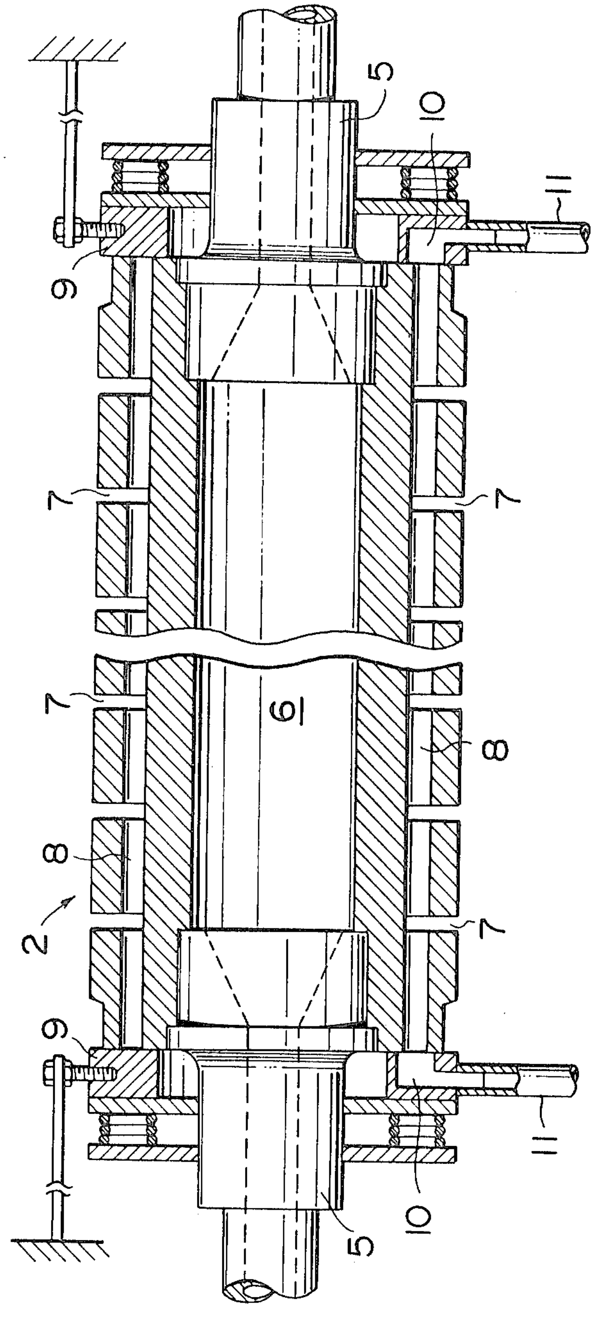

FIG. 1 is a schematic side view of the medium retaining device of this invention; and FIG. 2 is a partial cross-sectional view showing the detail of the lower corrugating roll.

A single faced corrugated paperboard manufacturing machine comprises a pair of upper and lower corrugating rolls 1, 2 engaging with each other, a pressure roll 3 cooperating with the lower corrugating roll 2, and an adhesive applicator 4. The lower corrugating roll 2 has support shafts 5 at both ends. A hollow portion 6 is formed in the lower corrugating roll 4 between the support shafts 5 to define a steam chamber into which steam is circulated through the bores of the support shafts 5 to heat the lower corrugating roll 2. The lower corrugating roll 2 has on its peripheral surface a number of longitudinally spaced apart annular suction grooves 7 formed therein and is provided with a plurality of longitudinally extending suction manifolds 8 in intersecting relationship with the annular suction grooves 7. The lower corrugating roll 2 is provided at both ends with sealing members 9 which are held stationary so as not to rotate with the roll 2. Each of the sealing members 9 has an arcuate recess or suction chamber 10 formed therein and extending from the nip between the upper and lower corrugating rolls 1, 2 to the nip between the lower roll 2 and the pressure roll 3 along that portion of the peripheral surface of the roll 2 on which the corrugated medium is carried, so that the arcuate recesses 10 communicate with those suction manifolds 8 between the nips. The arcuate recess 10 is connected to a vacuum source (not shown) through a suction pipe 11. The sealing members 9 close off the suction manifolds 8 except for those communicating with the arcuate recesses 10. To prevent loss of negative pressure applied to the annular suction grooves 7 through the suction manifolds 8 communicating with the arcuate recesses 10, a cover 12 is secured in place by appropriate means so as to cover that portion of the surface of the lower corrugating roll 2 on which no medium is carried.

In the process of manufacturing the single faced corrugated paperboard, the air in the arcuate recesses 10, the suction manifolds 8 and the annular suction grooves 7 is evacuated to establish subatmospheric pressure in the annular suction grooves 7. The medium 13 is passed between the upper and lower corrugating rolls 1, 2 to form corrugations therein and the corrugated medium 13 is attracted onto the lower roll 2 by a negative pressure to the medium through the annular suction grooves 7. While the lower corrugating roll 2 carries the medium 13 attracted thereonto between the two nips, adhesive is applied to the tops of corrugations formed in the medium by the adhesive applying device 4. A facing paper web 14 is passed between the lower roll 2 and the pressure roll 3 so that it is bonded to the adhesive-applied tops of the corrugations formed in the medium 13 to form the single faced corrugated paperboard. During rotation of the corrugating roll, the suction manifolds 8 along that portion of the roll surface on which the medium is carried, come into communication with the arcuate recesses 10 formed in the stationary sealing members 9 while the suction manifolds 8 along the remaining portion of the roll surface are closed off at both ends by the sealing members 9. Thus, while the corrugating roll is rotating, sufficient negative pressure is continuously created in the annular suction grooves 7 to cause the corrugated medium to suck to the peripheral surface of the corrugating roll.

Since this invention has the construction described above, paper dust produced when the medium is attracted onto the lower corrugating roll by suction is conveniently evacuated through the manifolds along with the air in the grooves. Should the paper dust stick to the suction manifolds and thereby deteriorate the suction capacity, the suction manifolds can easily be cleaned by removing the sealing members and inserting appropriate cleaning elements onto the manifolds. Further, since in this invention the suction manifolds 8 are formed in the corrugating roll so as to intersect the annular suction grooves 7, the drilling of the suction manifolds is very easily accomplished and therefore does not adversely affect the steam chamber. That is, the hollow portion in the corrugating roll can be used as the steam chamber in the same manner as in the conventional one, so that no modification is necessary on the device for heating the corrugating roll.

I claim:

1. A medium retaining device in single faced corrugated cardboard manufacturing machines comprising: a pair of upper and lower corrugating rolls engaging with each other between which a medium is passed to form corrugations therein; a plurality of longitudinally spaced annular suction grooves formed in the lower corrugating roll along its peripheral surfaces; a plurality of suction manifolds formed in the lower corrugating roll extending longitudinally of the roll to intersect the annular suction grooves; sealing members arranged at both ends of the lower corrugating roll; a suction chamber formed in each sealing member and communicating with the suction manifolds to develop subatmospheric pressure in the annular suction grooves, thereby sucking the corrugated medium onto the roll; and a cover which covers that portion of the peripheral surface of the lower corrugating roll which is opposite to the portion of the roll surface on which the medium is carried.

2. A medium retaining device as set forth in claim 1, wherein the suction chamber formed in the sealing member comprises an arcuate recess extending from the nip between the upper and lower corrugating rolls to the nip between the lower corrugating roll and a pressure roll along that portion of the surface of the lower roll on which the corrugated medium is carried.

* * * * *